(No Model.)

W. H. DODGE.
PULLEY.

No. 412,916. Patented Oct. 15, 1889.

Attest.
W. B. Hosford.
Nice W. Dodge

Inventor
Wallace H. Dodge
By his Atty.
R. D. O. Smith

UNITED STATES PATENT OFFICE.

WALLACE H. DODGE, OF MISHAWAKA, INDIANA.

PULLEY.

SPECIFICATION forming part of Letters Patent No. 412,916, dated October 15, 1889.

Application filed June 5, 1889. Serial No. 313,154. (No model.)

*To all whom it may concern:*

Be it known that I, WALLACE H. DODGE, of Mishawaka, in the county of St. Joseph, in the State of Indiana, have invented new and useful Improvements in Separable Pulleys; and I do hereby declare that the following is a full and accurate description of the same, reference being had to the accompanying drawings, wherein—

Figure 1:
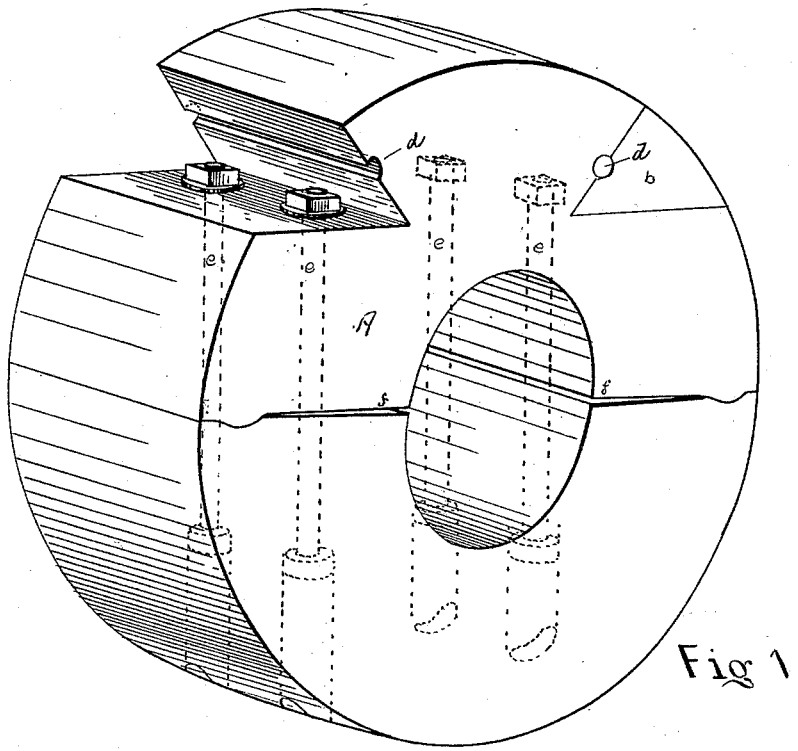
Figure 2:
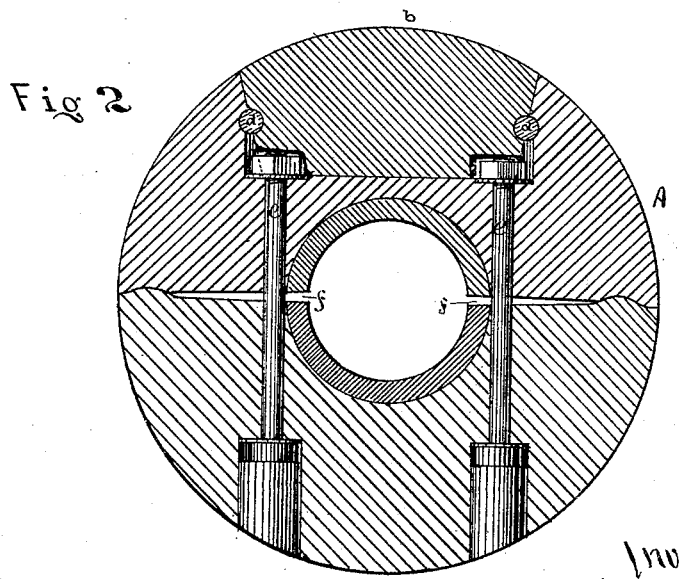

Figure 1 is a perspective view of my pulley, one section being removed. Fig. 2 is a section in plane of revolution, showing a modified section.

In the patent granted to Dodge and Philion July 4, 1882, No. 260,462, a mode of fastening the pulley upon the shaft by compression without the use of keys or set-screws is described, and also a mode of adapting the same pulley to shafts of various sizes by means of a system of interchangeable bushes. The compression therein described is secured by means of compression-bolts transverse to the axis, the line of division of the pulley being substantially in the plane of the axis, said bolts passing through the spoke-arms and having nuts clear within the rim.

Heretofore it has been inconvenient to make pulleys with arms and separate rim and small in diameter, whereby the clamping-bolts can be reached between the rim and arm.

The object of this improvement is to obviate this difficulty and enable me to make my pulley with separable parts joined together and clamped upon the shaft by means of bolts transverse to the shaft and much smaller in diameter than heretofore.

A is my pulley, which, for convenience, may be made with alternate layers of wood glued or otherwise fastened together, with the grain alternately in different directions to obviate the liability to split, though it may be made from solid wood, or in any other suitable way which for any reason may be preferred. This pulley-blank is then divided on a line substantially in plane of the axis, though it is manifest the parts may be made separately and fitted together. The central hole for bushing or for shaft is then bored. As it is necessary that the bolts and nuts shall be wholly concealed, one or more pieces *b* are then cut out from the periphery to furnish concealed seats for the nuts. The directions of the boundaries of the piece *b* are such that the surfaces will come together again by moving said piece inward across the sawkerf. The directions of said boundaries are also such that when said pieces *b* are in place one or more holes may be bored in the ends of the pulley, having the axis in the line of the joint between said piece and the pulley, and a dowel-pin *d* or screw being inserted in said hole will key said part in place. The heads of the clamping-bolts *e* may be concealed in one part of the pulley, or both parts may have sections *b* removed, if for any reason that should be preferred. One or both of the opposing surfaces on the line of separation are cut away, as at *f*, nearly to the periphery, so that the clamping-bolts may act upon the bush to press it upon the shaft, which it would not be able to do if said opposing surfaces of the pulley should come together before the requisite shaft-pressure had been attained.

Having described my invention, I claim as new—

1. A solid pulley separable on a line substantially in the plane of the axis, provided with clamping-bolts transverse to said line of separation, and one or more removable sections *b* to cover and conceal the nuts of said clamping-bolts, said sections *b* having such boundary-lines that they may be keyed in place by fastenings inserted from the ends, combined with the fastening-pins *d*, substantially as set forth.

2. A solid pulley separable on a line in the plane of the axis, or thereabout, having the opposing surfaces slightly separated, except near the periphery, clamping-bolts transverse to said line of separation, one or more removable sections of the periphery to cover and conceal said bolts, and removable fastenings inserted in the ends to retain said sections, substantially as set forth.

3. The pulley A, divided substantially in the plane of the axis, with its opposing surfaces slightly out of contact, except near the periphery, provided with one or more removable pieces $b$ and dowel-keys $d$, the direction of the boundaries of said piece $b$ being such that it cannot move from its place when said key is in place, substantially as set forth.

4. A pulley A, provided with a removable peripheral section $b$ and retaining-keys $d$, inserted from the end, substantially as set forth.

WALLACE H. DODGE.

Witnesses:
CHAS. ENDLICH,
W. B. HOSFORD.